(No Model.)
A. KRIBS.
GLASS MOLD.
No. 274,790. Patented Mar. 27, 1883.
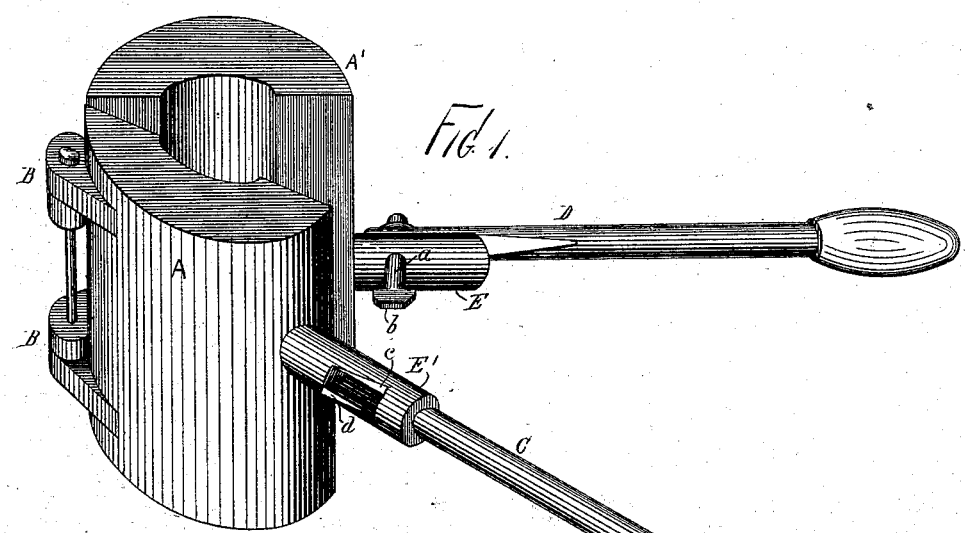
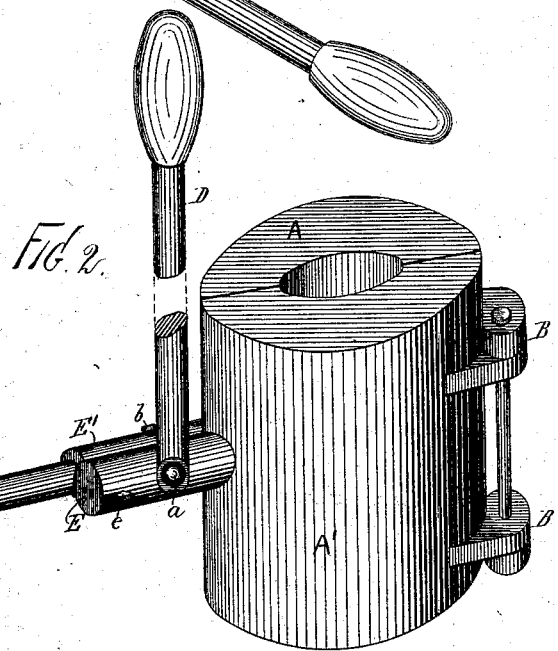

UNITED STATES PATENT OFFICE.

ANTHONY KRIBS, OF BROOKLYN, NEW YORK.

GLASS-MOLD.

SPECIFICATION forming part of Letters Patent No. 274,790, dated March 27, 1883.

Application filed January 17, 1883. (No model.)

*To all whom it may concern:*

Be it known that I, ANTHONY KRIBS, of Brooklyn, county of Kings, and State of New York, have invented certain new and useful Improvements in Glass-Molds, of which the following is a full, clear, and exact description, reference being had to the accompanying drawings, and to the letters of reference marked thereon.

My invention has relation to glass-molds and other molds of a like general character, and especially to the means employed for opening, closing, and locking the parts of the mold together.

Heretofore in this class of devices the molds have been ordinarily locked, after being closed, by a separate key or pin, or by some locking contrivance requiring the operator to remove his hand from the mold-handle in order to accomplish the locking, or to remove his hand from the lock in order to open the mold.

The object of my invention is to provide the mold with a simple, cheap, and durable form of locking arrangement, which the mold-holder may operate instantaneously without loosening the grasp of either hand, and one which will pinch the parts of the mold tightly together and not be likely to get out of order. To accomplish all of this my improvements involve certain novel and useful arrangements or combinations of parts and peculiarities of construction, all of which will be herein first fully described, and then pointed out in the claims.

In the accompanying drawings, forming part of this specification, Figure 1 is a perspective view of one form of glass-mold having my improvements applied in connection therewith, the two parts of the mold being shown in open position. Fig. 2 is a like view, showing the mold closed and locked in accordance with my invention.

In both these figures like letters of reference, wherever they occur, indicate corresponding parts.

A A' are the two parts of the mold, of any suitable form, hinged together as at B B. The mold is closed to receive the material to be molded, and opened to remove the article formed.

C is a handle, of ordinary form, secured to one side of the mold in the usual way. D is the handle for the other side. The handle D, instead of being rigidly secured in place, is provided with a short bolt or bar, $a$, at right angles thereto, which passes through a short stub or lug, E, as shown, forming a hinge or axle on which said handle may be turned up or down, and by which it is held against accidental displacement. The bar $a$ is preferably riveted in its place, and has a shoulder for bearing against the inner side of lug E, so as to prevent withdrawal of the handle; but this form of union might be changed, if desired. On the end of bar $a$ is a cross-piece, $b$, fitted to enter (when the parts of the mold are closed) a perforation cut for it through the lug or stub E', in which the handle C is secured. The exterior surface of lug E', above and below the perforation, is cut or otherwise formed inclined, as shown at $c$ and $d$, one part being inclined in one direction and the other in the opposite direction, so that when the cross-piece $b$ is turned up it will wedge against both inclined parts. The lug E' is usually cast with the perforation in it; but the handle C might be otherwise affixed to the mold, in which case the handle itself could be perforated for the reception of the locking cross-piece, and have the inclined locking-surfaces formed above and below the perforation. The appliances being thus arranged, the mold-holder grasps both handles, brings them together to close the mold, turns handle D upwardly, as shown in Fig. 2, and thus locks the two parts securely together. After the material has been molded he has only to lower handle D and separate the two handles. With these handles the mold can be carried and shifted about, same as with the ordinary solid handle.

At $e$, on the lug E, is a ledge or other simple stop, the purpose of which is to prevent handle D from falling below the horizontal line, so that it is always kept in position to be readily seized by the operator.

The improved form of lock, as thus constructed and arranged, is applicable upon single or double molds, and upon press-molds or blow-molds, and will be found to admirably answer all the purposes or objects of the invention, as previously stated.

Having now fully described my invention, what I claim as new, and desire to secure by Letters Patent, is—

1. In a mold of the character herein set forth, one of the main handles hinged upon a lug or stub, and carrying a bar with a cross-piece arranged to enter a perforation cut for it in the opposite lug or handle, said bar and cross-piece being movable with the attached handle for the purpose of forming the lock, substantially as shown and described.

2. In a mold having one of the main handles hinged thereto, and carrying an attached bar and cross-piece, the perforated lug or handle arranged to receive the cross-piece, and having its surface above and below the perforation cut in oppositely-inclined directions, substantially as and for the purposes set forth.

3. In combination with the lug or stub having the movable handle and locking-bar mounted thereon, the ledge or stop for the purpose of preventing the handle from dropping below a certain point, substantially as set forth.

In testimony that I claim the foregoing I have hereunto set my hand in the presence of two witnesses.

ANTHONY KRIBS.

Witnesses:
JOHN BUCKLER,
WORTH OSGOOD.